US011561668B2

(12) United States Patent
Swinehart et al.

(10) Patent No.: US 11,561,668 B2
(45) Date of Patent: *Jan. 24, 2023

(54) AUTO-SCROLL ON IN-CONTEXT MODULES

(71) Applicant: PAYPAL, INC., San Jose, CA (US)

(72) Inventors: Stacey Swinehart, San Jose, CA (US); Cody Evol, San Jose, CA (US); Shilpa Dhar, San Jose, CA (US)

(73) Assignee: PAYPAL, INC., Sunnyvale, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 16/781,905

(22) Filed: Feb. 4, 2020

(65) Prior Publication Data
US 2020/0279071 A1 Sep. 3, 2020

Related U.S. Application Data

(63) Continuation of application No. 15/676,799, filed on Aug. 14, 2017, now Pat. No. 10,552,519, which is a continuation of application No. 14/481,586, filed on Sep. 9, 2014, now Pat. No. 9,734,135.

(60) Provisional application No. 61/875,369, filed on Sep. 9, 2013.

(51) Int. Cl.
*G06F 3/04812* (2022.01)
*G06F 3/0485* (2022.01)
*G06F 3/04886* (2022.01)
*G06F 40/174* (2020.01)
*G06F 16/957* (2019.01)

(52) U.S. Cl.
CPC ........ *G06F 3/04812* (2013.01); *G06F 3/0485* (2013.01); *G06F 3/04886* (2013.01); *G06F 16/9574* (2019.01); *G06F 40/174* (2020.01)

(58) Field of Classification Search
CPC .............. G06F 3/04812; G06F 3/0485; G06F 3/04886; G06F 16/9574; G06F 40/174
See application file for complete search history.

(56) References Cited

U.S. PATENT DOCUMENTS

| 2013/0346302 A1* | 12/2013 | Purves | G06Q 20/102 |
| | | | 705/40 |
| 2014/0372866 A1* | 12/2014 | Tidhar | G06F 40/174 |
| | | | 715/234 |
| 2015/0012287 A1* | 1/2015 | Vucovich | G16H 10/65 |
| | | | 705/2 |

* cited by examiner

*Primary Examiner* — Ting Z Lee
(74) *Attorney, Agent, or Firm* — Haynes and Boone, LLP

(57) ABSTRACT

Systems and methods are disclosed which may provide modules that may be displayed in the context of a website that allow for autoscrolling between the modules upon entering required information in the modules or completing actions required by the modules. The modules may be modules for paying for items via PayPal and may include modules for entering payment information, billing information, a shipping address, creating an account, and accepting terms and conditions. The modules may be displayed within the context of the webpage when selecting a pay with PayPal link without navigating away from the webpage. As a user enters information into a module, the module will automatically scroll to the next module if the module permits automatic scrolling.

20 Claims, 11 Drawing Sheets

Pay with module

Pay with
Enter card number
Expires MM/YY | CSC 3 or 4 digits

Billing Address

OnkeyUp, last digit of CSC →
Autoscroll to next module
1. If error, keep user on this module.
Cannot advance to next module unless inline (front-end) validation OK.

DE-bank/card/IBAN

2. OnkeyUp, last digit of DOB
→ autoscroll to next module

Pay with
Bank | Card
Account number 1 to 10 digits
Bar code 8 digits
Bank name provider
DOB MM/DD/YY
Use IBAN

FIG. 6

Account creation module

Just create a password!

Value prop IMAGE

You can check out with just your email and password next time. We never share your info with merchants.

Email address

Password | Confirm password

Terms and conditions

OnKeyUp, last letter of confirm password → Autoscroll to next module
1. It will autoscroll if they 2 fields match
2. If error, user will need to re-enter password fields, or if email address doesn't read as a valid address with inline validation.

FIG. 9

Terms and conditions module

Terms and conditions

Terms and conditions in this space. Lorem Ipsum dolor sit amet.

☑ I agree to the terms and conditions.

Continue

FOOTER

No auto scroll on this page.
Submit button for completing PayPal transaction and going to merchant.

FIG. 10

AUTO-SCROLL ON IN-CONTEXT MODULES

RELATED APPLICATION

This application is a continuation of issued U.S. Pat. No. 10,552,519, which is a continuation of U.S. patent application Ser. No. 14/481,586, filed Sep. 9, 2014, and issued as U.S. Pat. No. 9,734,135, which claims the benefit of U.S. Provisional Application No. 61/875,369, filed Sep. 9, 2013, the entire disclosure of which is incorporated herein by reference.

BACKGROUND

Technical Field

Embodiments disclosed herein are related to systems and methods for auto-scrolling through interactive modules displayed in the context of a webpage.

Related Art

Typically, when a user is browsing a website and clicks a link on the website to take an action or request a service provided by the link, the click will open a new browsing window or tab, and the focus will be away from the previous webpage. When the requested action or service is related to the content of the previous webpage, this can be a nuisance to the user.

Moreover, if the requested action or service provided by the new browsing window includes form fields to be filled, the user may have to manually scroll through each of the series of fields until completed, which can also be a nuisance for users. Moreover, this can be problematic when the user is browsing using a mobile device.

BRIEF DESCRIPTION OF THE FIGURES

FIG. 6 provides an example of a "Pay with module" with specific rules and functionalities for this module.

FIG. 9 provides an example of an "Account creation module" with specific rules and functionalities for this module.

FIG. 10 provides an example of a "Terms and conditions module" with specific rules and functionalities for this module.

Figure 1:
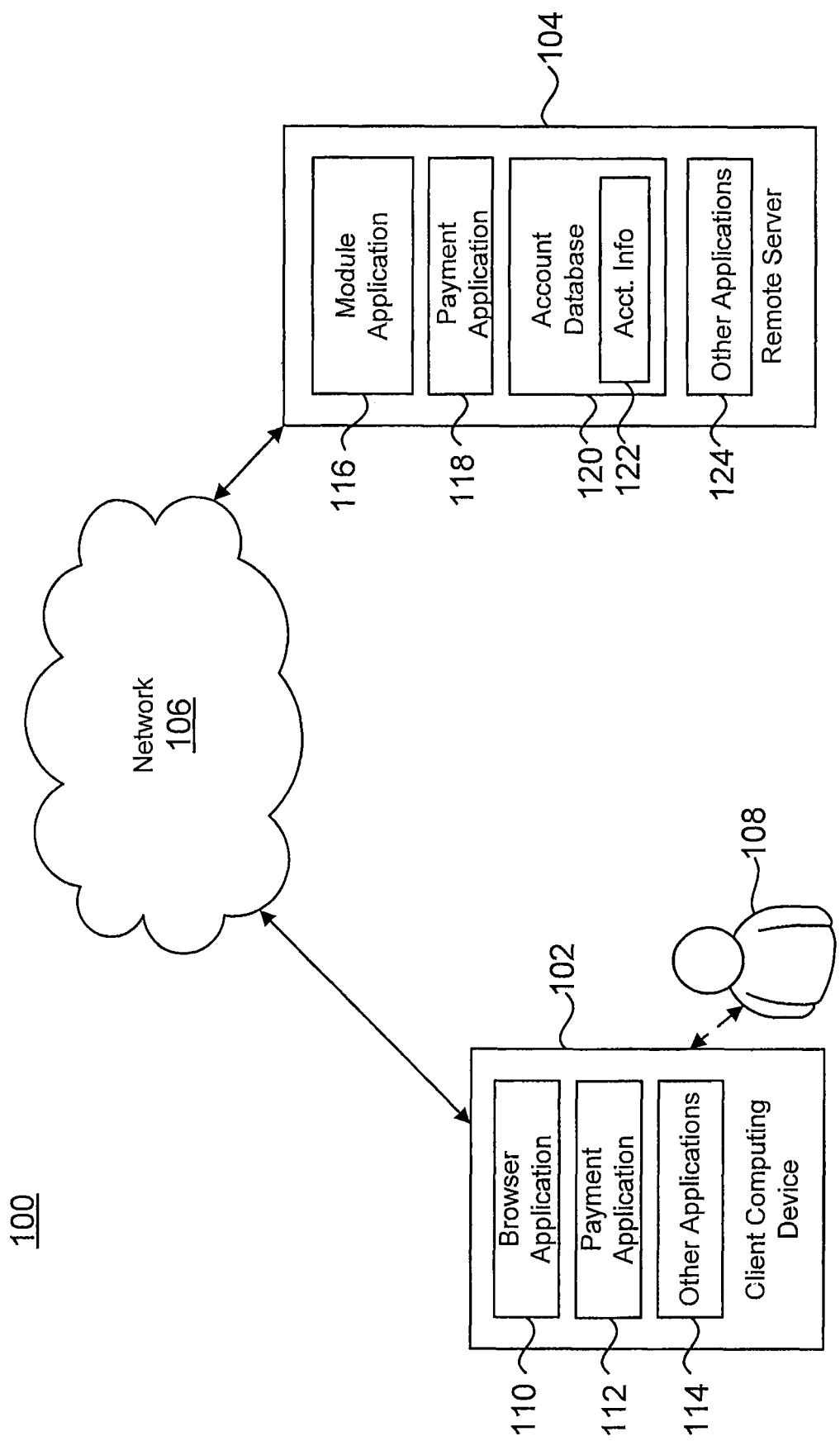
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

There is a need for displaying content in the context of a webpage without navigating away from the webpage and being able to auto scroll through form fields of the webpage. Embodiments consistent with this disclosure may provide various modules which may be displayed within the context of the webpage without navigating away from the webpage while providing rules for autoscrolling from an active module to a next module.

In an embodiment, a system or a method is provided to display a module over a current content on a display in response to activation of a link provided in the current content. The module may include one or more fillable forms configured to receive input from a user. The system may determine whether the one or more fillable forms are completed correctly and may permit the user to navigate to a subsequent module when the one or more fillable forms of the module are completed correctly.

In an embodiment, the user is navigated to the subsequent module by automatic scrolling from the module to the subsequent module when the one or more fillable forms of the module are completed correctly. In another embodiment, the user is navigated to the subsequent module when a down button displayed on the display device is selected and the one or more fillable forms of the module are completed correctly. The one or more fillable forms are completed correctly when a number and a type of characters or numbers are correctly filled in each fillable form of the module. The current content remains under the module and the subsequent module as the modules and the subsequent module scroll over the current content.

FIG. 1 is a block diagram of a networked system 100, consistent with some embodiments. System 100 includes a client computing device 102 and a remote server 104 in communication over a network 106. Remote server 104 may be a hosting server that hosts webpages and other online content accessible by user 108 using client computing device 102 over network 106. In some embodiments, remote server 104 may correspond to a payment service processing server that may be maintained by a payment service provider, such as PayPal, Inc. of San Jose, Calif. Remote server 104 may be maintained by other service providers in different embodiments. In some embodiments, remote server 104 may correspond to a payment service processing server and also host merchant-specific content. Moreover, remote server 104 may correspond to one or more servers in some embodiments.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by a user 108. For example, such instructions may include a browser application 110 such as a mobile browser application, which may be used to provide a user interface to permit user 108 to browse information available over network 106, including information hosted by remote server 104. For example, browser application 110 may be implemented as a web browser to view information available over network 106. Browser application 110 may include a graphical user interface (GUI) that is configured to allow user 108 to interface and communicate with remote server 104 or other servers managed by content providers or merchants via network 106. For example, user 108 may be able to access websites to find and purchase items, as well as access user account information or web content.

Client computing device 102 may also include a payment application 112. In some embodiments, payment application 112 may be capable of providing user 108 with an interface for making payments using client computing device 102 over network 106, including payments to be processed by remote server 104. Client computing device 102 may further include other applications 114 as may be desired in one or more embodiments to provide additional features available to user 108, including accessing a user account with remote server 104. For example, applications 114 may include interfaces and communication protocols that allow the user to receive and transmit information through network 106 and to remote server 104 and other online sites. Applications 114 may also include security applications for implementing client-side security features, programmatic client applications for interfacing with appropriate APIs over network 106 or various other types of generally known programs and/or applications.

Remote server 104 may also be maintained by an online payment provider, such as PayPal, Inc. of San Jose, Calif., which may provide processing for online financial and information transactions on behalf of user 108. Remote server 104 may include a module application 116 which may be capable of providing one or more modules to be displayed in the context of a webpage without navigating away from the webpage. Typically, when user 108 is viewing a webpage with browser application 110 and selects a link that links to one or more functionalities provided by remote server 104, browser application 110 will be redirected from the current webpage to a new webpage hosted by remote server 104. However, module application 116 may include instructions such that when user 108 selects a link displayed in browser application 110, browser application 110 will display one or more modules that are displayed within the context of the current webpage. In some embodiments, the displayed modules may include modules for paying, entering a billing address, a shipping address, creating an account, and reviewing and accepting terms and conditions. In some embodiments, the modules may be displayed overlaying the current webpage. Moreover, module application 116 may include instructions enabling browser application 110 to automatically scroll through one or more form fields within the modules and between the one or more modules. In some embodiments, the functionalities provided by module application 116 may be enabled by processor-executable code that may be executed by one or more processors of remote server 104, provided to client computing device 102 for execution by one or more processors as part of browser application 110, and/or provided to a third-party server hosting the current website.

Remote server 104 may also include a payment application 118 that may be capable of processing payments for users, such as user 108. In some embodiments, payment application 118 may be capable of interfacing with payment application 112 of client computing device to process payments on behalf of user 108. Remote server 104 may further include an account database 120 that includes account information 122 for users having an account on remote server 104, such as user 108. Account information 122 in account database 120 may also include the locations of merchants, including merchants having merchant-specific content 118. Remote server 104 may include other applications 124 providing other functionalities.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
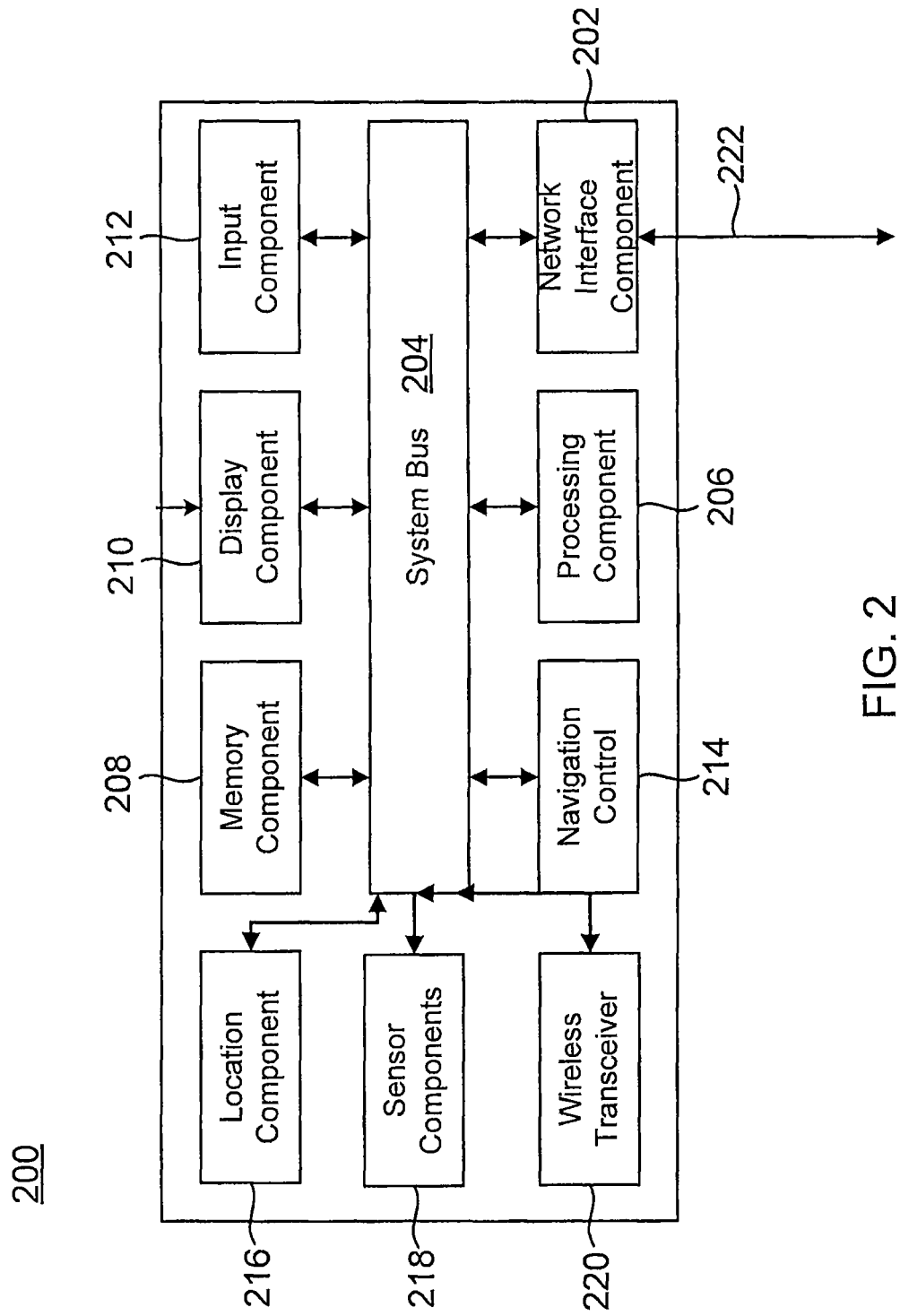
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 106 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user 108 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as user 108, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 108 and/or client computing device 102 that may be associated with any actions that user 108 performs using client computing device 102. Sensor components 218 may include camera and imaging components, accelerometers, biometric readers, GPS devices, motion capture devices, and other devices that are capable of providing information about client computing device 102 or user 108, or an environment therearound. Computing system 200 may also include one or more wireless transceivers 220 that may each include an antenna that is separable or integral and is capable of transmitting and receiving information according to one or more wireless network protocols, such as WiFi™, 3G, 4G, HDSPA, LTE, RF, NFC, IEEE 802.11a, b, g, n, ac, or ad, Bluetooth®, BLE, WiMAX, ZigBee®, etc.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 106 (e.g., such as a LAN, WLAN, PTSN, and/or various other wired or wireless networks, including telecommunications, mobile, and cellular phone networks) may perform instruction sequences to practice, the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
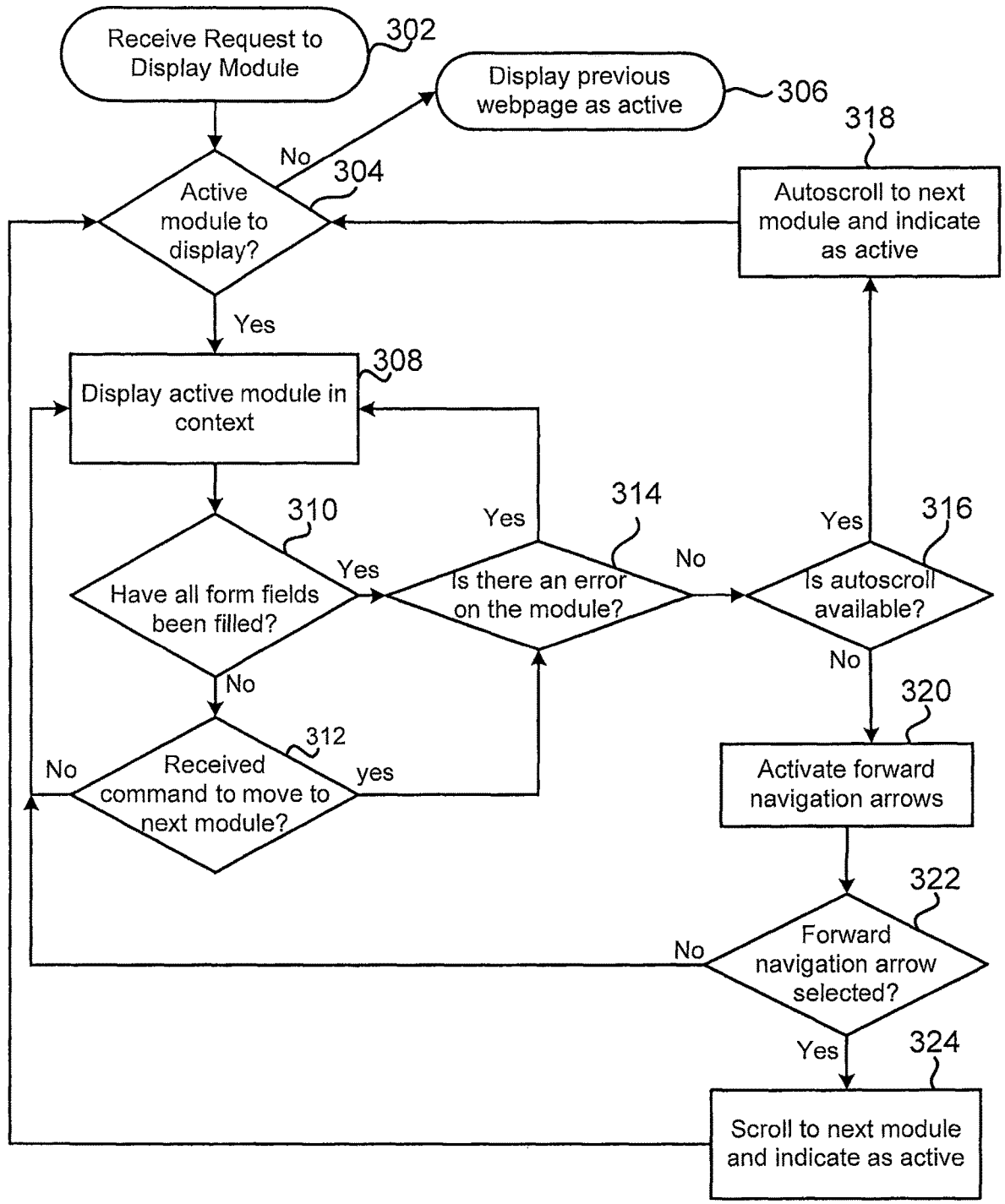
FIG. 3 is a flowchart illustrating a process for automatically scrolling through one or more displayed modules, consistent with some embodiments.

FIG. 3 is a flowchart illustrating a process 300 for automatically scrolling through one or more displayed modules, consistent with some embodiments. For the purpose of illustration, FIG. 3 may be described with reference to any of FIG. 1 or 2. Process 300 shown in FIG. 3 may be embodied in computer-readable instructions for execution by one or more processors such that the steps of process 300 may be performed by remote server 104. In some embodiments, module application 116 of remote server 104 may include instructions for performing one or more steps of process 300. As shown in FIG. 3, process 300 may be initiated when remote server 104 receives a request to display a module (302). In some embodiments, the request to display a module may be received in response to user 108 clicking or selecting a link to a webpage or service provided by remote server 104 using browser application 110.

In response to the user 108's clicking or selecting a link on a webpage to direct to user to or open up another webpage, the system may determine whether the link is directed to webpage related to a fillable form, an agreement requiring a response, or any webpage that requires an input from the user after which the user likely would want to return to the current webpage. If the link is configured to direct the user to another webpage from which the user likely would want to return to the current webpage or if the user likely would want to preserve the current page, the system may display the another webpage in the module format, by which the contents of the another page are displayed as scrollable modules over the current webpage. By displaying the new webpage as scrollable modules overlaying the current webpage, the user 108 may preserve the current page when the user 108 clicks on or selects the link, without navigating away from the current page.

When the system determines to display the new webpage as scrollable modules, a determination may be made as to whether there is an active module to currently be displayed (304). In some embodiments, an active module is a module that has not yet been completed, includes form fields that have not yet been filled in, requires an action by user 108, and the like. In some embodiments, an active module may be a first or initial module to be displayed in response to the request. When there is no active module to be displayed, the webpage including the link to remote server 104 may be displayed as active (306).

When there is an active module to be displayed, module application 118 may display the active module in context (308). That is, the active module may be displayed overlaying or superimposed on the current webpage, without navigating away from the current webpage. In some embodiments, the displayed active module may have one or more form fields requiring entry from user 108, and a determination may be made as to whether all form fields have been filled (310). When all form fields have not been filled, module application 116 may wait for a command to move to the next module (312). In some embodiments, a command to move to the next module may include selecting an arrow, tabbing through the form fields, pressing a Page Down or End key, and the like. When a command to move to the next module is not received, the active module may continue to be displayed in context (308). When all form fields have been filled or when a command to move to the next module has been received, module application 116 may determine if there is an error in the module (314). An error may be a form field that has not been filled, a form field having an entry that is not formatted correctly, and the like. When there is an error, the active module may continue to be displayed in context (308).

When there is no error, a determination may be made to determine whether the active module supports autoscroll (316). In some embodiments, some modules may be configured to support autoscroll, while other modules may not permit autoscrolling. When autoscroll is available, the next module to be displayed may be autoscrolled to and designated as the active module (318) and, as long as there is an active module to be displayed (304), the newly designated active module may be displayed in context (308). In some embodiments, if client computing device 102 is a mobile device, the autoscroll to the next module may be adaptive and may include a free and/or natural scroll. When autoscrolling is not available for a particular module, a forward navigation arrow may be activated (320). In some embodiments, each module may include forward and backward navigation arrows for manually scrolling between the different modules. Typical settings may include disabling the forward navigation arrow until user 108 has completed all of the form fields, or has otherwise activated the next module. Typical settings may also include having backward navigation arrows always active and having forward navigation arrows disabled until a backward navigation arrow is selected. A determination may then be made to determine when the forward navigation arrow is selected (322). As long as the forward navigation arrow is not selected, the active module may continue to be displayed in context (308). When the forward navigation arrow is selected, the next module to be displayed may be scrolled to and designated as the active module (324) and, as long as there is an active module to be displayed (304), the newly designated active module may be displayed in context (308).

Figure 4A:
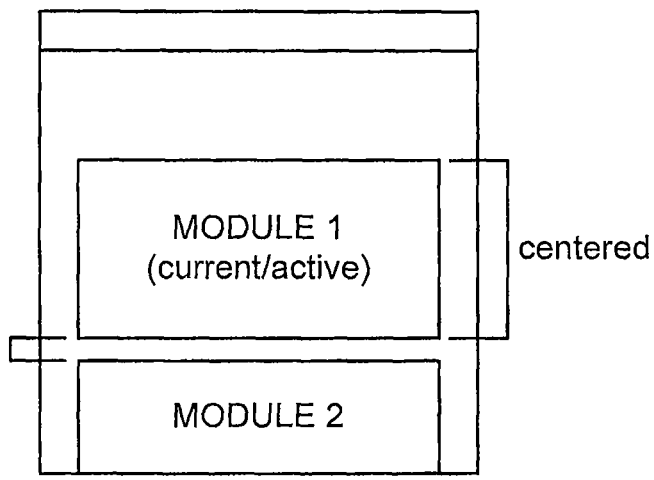
FIGS. 4A-4E illustrate examples of displaying and scrolling between modules, consistent with some embodiments.

FIGS. 4A-4E illustrate examples of displaying and scrolling between modules, consistent with some embodiments. As shown in FIG. 4A, an active module, e.g., module 1, may be displayed at a center area in the display. A next, inactive module, e.g., module 2, may be displayed at a lower side of the active module and separated from the active module by a predetermined space. When the modules move, the predetermined space may be maintained between the modules.

Figure 4B:
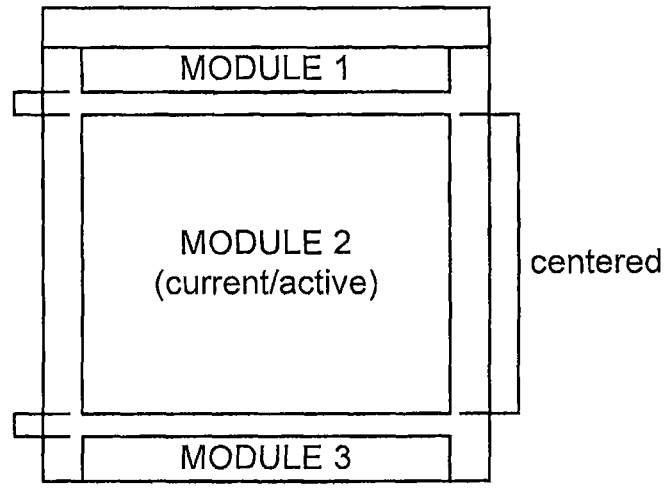

As shown in FIG. 4B, module 2 may be activated and be displayed at the center area of the display. In an embodiment, module 2 may be activated by scrolling module 2 to the center area of the display. Module 1 now may be positioned above module 2 and a subsequent module 3 may be positioned below module 2. The modules may be separated from each other by the same predetermined space. As also shown in FIGS. 4A and 4B, the modules that a user, such as user 108, may be able to navigate to are more darkly shaded while modules to which user 108 is not yet able to navigate to are more lightly shaded. In an embodiment, user 108 may not be able to navigate to a next module, whether by scrolling or command, until previous modules have been completed.

Figure 4C:
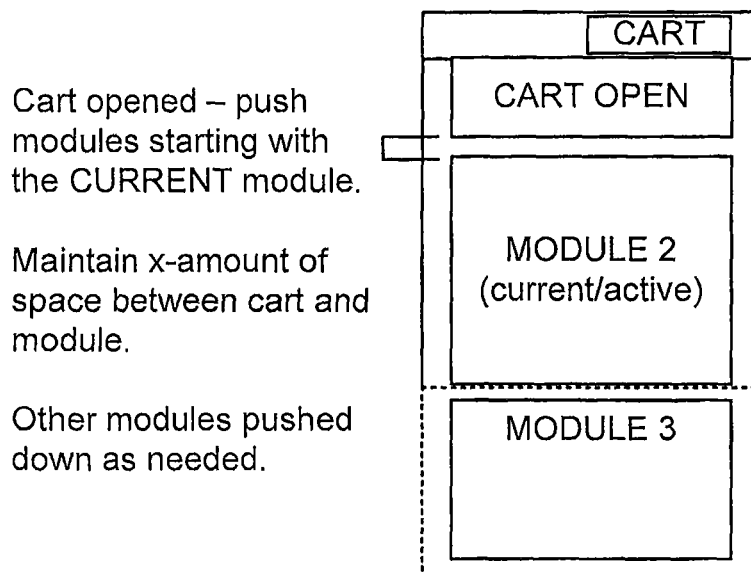
Figure 4D:
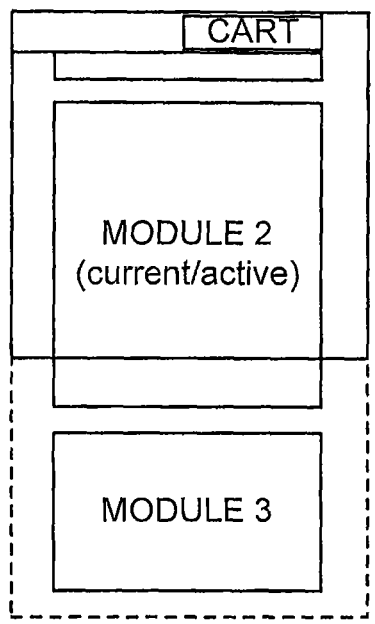
Figure 4E:
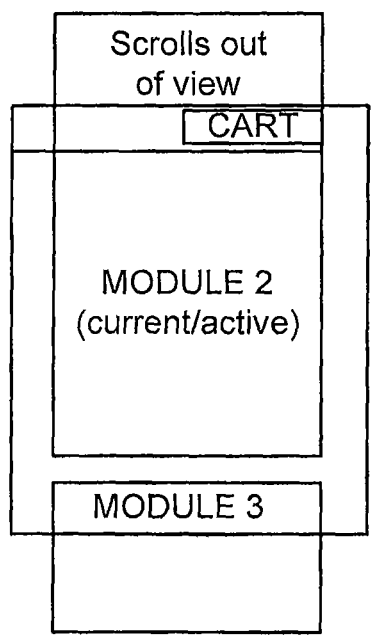

As shown in FIG. 4C, when user 108 is purchasing an item, a cart module may be displayed above the active module 2. When user 108 selects or clicks on the cart, the cart may be opened and viewable above the active module. When the cart is opened, other modules may be pushed down as needed. As shown in FIGS. 4D and 4E, when the active module has been completed, the active module may scroll upwards to display the next module, which may then be marked as the active module. In some embodiments, the scrolling may be automatic, or may be initiated by a user command. Moreover, the cart module may remain stationary at the top of the screen above the active module, even as the active module changes as one module scrolls to another module.

Figure 5:
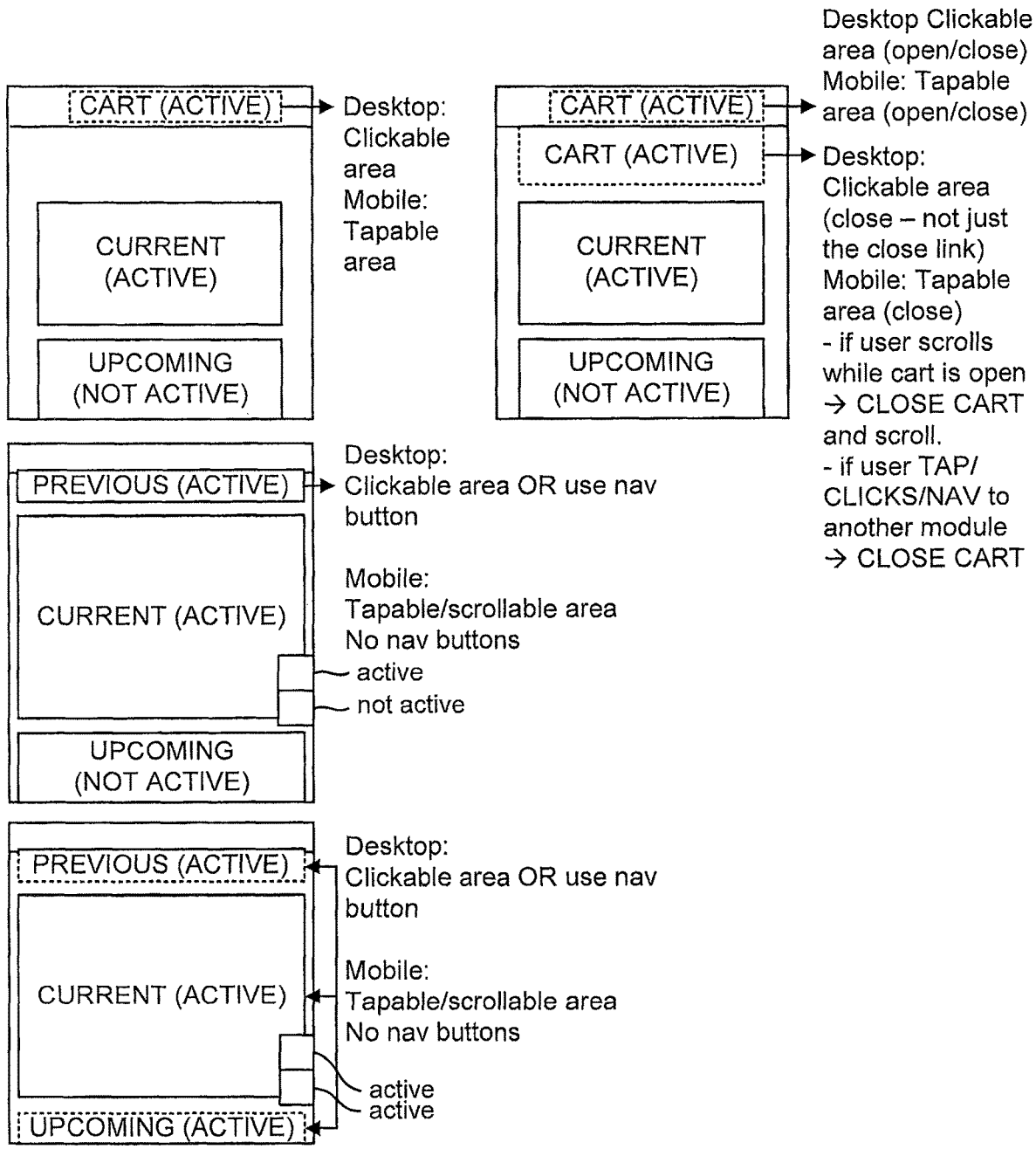
FIG. 5 illustrates examples of active and not active modules and acceptable ways for interacting with these modules on both desktop and mobile.

FIG. 5 illustrates examples of active and inactive modules and acceptable ways for interacting with these modules on both desktop and mobile. As shown in FIG. 5, an active module is clickable and may accept the use of navigation buttons on desktop. While on a mobile device, active modules may be tapable and scrollable but may not include navigation buttons. In an embodiment, a selectable button may be provided at a top header area of the display. The button may be labeled with the name of a module. A user may select the button to open or close the named module. For example, a button named "CART" may be provided at the top header area of the display. When the user selects the button "CART", the "CART" module may be opened or closed. In the desktop mode, the button may be a clickable area which the user may select by clicking on the button. The user also may click directly on the "CART" module to open or close the module. In the mobile mode, the button may be a tapable area which the user may tap with a finger to open or close the button. The user also may scroll away from the module to close the module. For example, in the mobile mode, the user may tap on the "CART" button displayed on the header or on the "CART" module to open or close the "CART" module. The user also may scroll away from the "CART" module to other modules to close the "CART" module.

In an embodiment, when an active module is displayed, a lower portion of a previous module may be displayed just above the active module and a top portion of a subsequent module may be displayed just below the active module. In the mobile mode, the lower portion of the previous module may be tapable or scrollable to activate the previous module. Similarly, the top portion of the subsequent module may be tapable or scrollable to activate the subsequent module. In the desktop mode, navigation buttons may be provided on a side area of the active module to navigate or to activate the other modules. For example, miniature icons or buttons representing different modules may be provided at the side area of the display. The miniature icon representing the active module may be shaded darker than miniature icons representing the other non-active modules. The user may select or click on the different miniature icons or buttons to activate the respective modules represented by the miniature icons or to navigate among the different modules.

FIG. 6 provides an example of a "Pay with module" with specific rules and functionalities for this module. The "Pay with module" may be activated when a user selects a payment link in a website of a merchant. The payment link may be embedded in a checkout page, a shopping page, or any other page that directs the user to making payment over the internet. In an embodiment, the pay with module may be configured to receive the user's payment card number, expiration date of the payment card, and the card security code (CSC) of the payment card. In another embodiment, the pay with module may include buttons for the user to choose to pay with a bank account or with a payment card account. If the user selects to pay with a bank account, the module may be configured to receive the user's bank account number, bank routing number, and the user's date of birth. The pay with module may require that the user enter all information before going to the next module. In particular, the system may check and determine whether the information entered by the user is in the correct format, such as the correct type or correct number of digits or characters.

Figure 7:
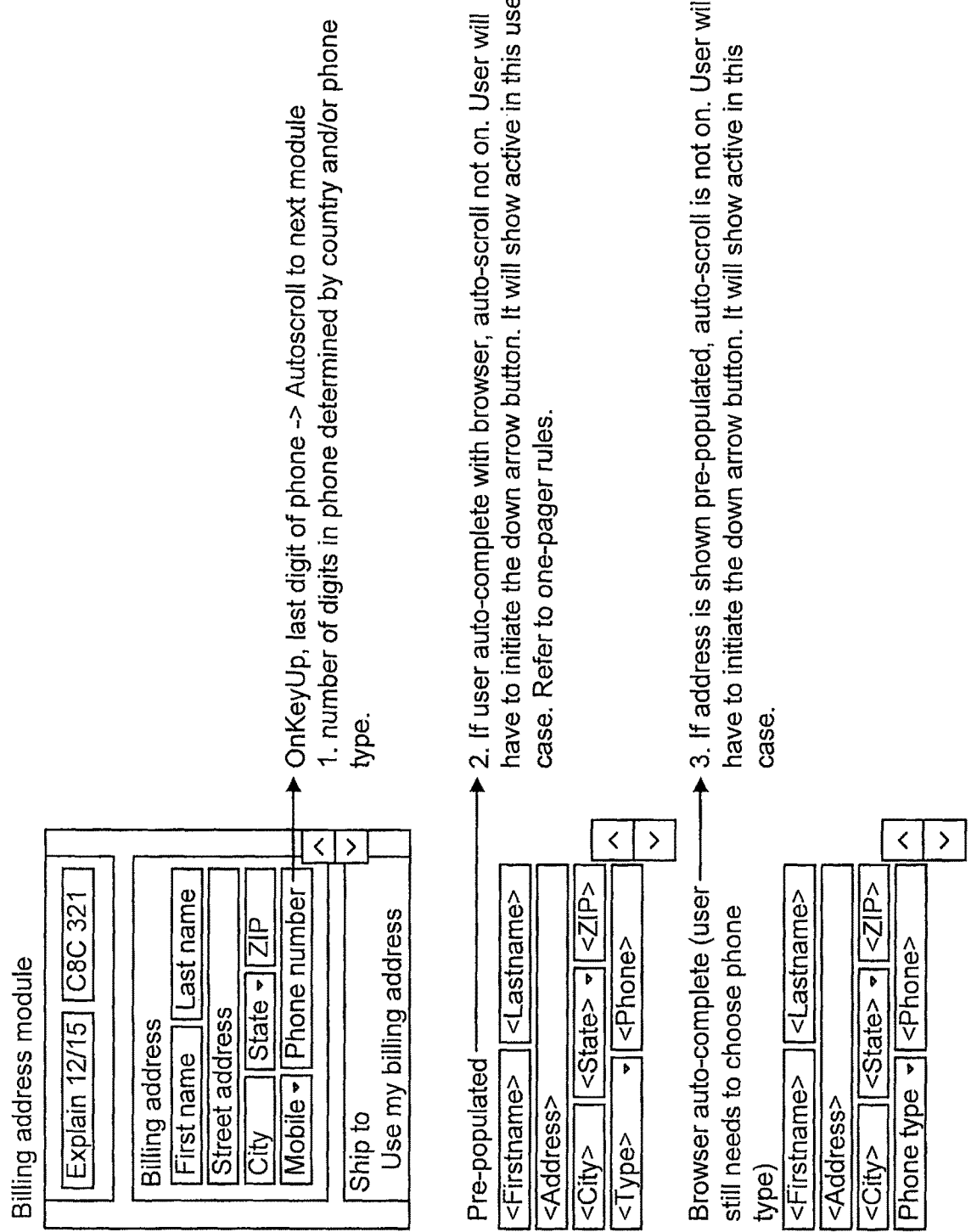
FIG. 7 provides an example of a "Billing address module" with specific rules and functionalities for this module.

FIG. 7 provides an example of a "Billing address module" with specific rules and functionalities for this module. After the user enters correct information for the pay with module, the system may then allow the user to advance to the billing address module. In an embodiment, the system may automatically scroll from the pay with module to the billing address module after the user correctly finished filling in the information at the pay with module. The billing address module may include form fields configured to receive the user's first name, last name, street address, city, state, zip code, type of phone number, and phone number. In an embodiment, the user may have auto-complete function in the browser and the browser may automatically fill in the information into the billing address module. If the user has auto-complete but does not have auto-scroll function on, navigation buttons, such as up and down arrow buttons, may be provided for the user to navigate to the next module. In an embodiment, with the auto-complete function, the user may still need to choose the phone type and the phone number to be input into the billing address module. After all fields are correctly filled in, the system may automatically scroll to the next module if the auto-scroll function is on.

Figure 8:
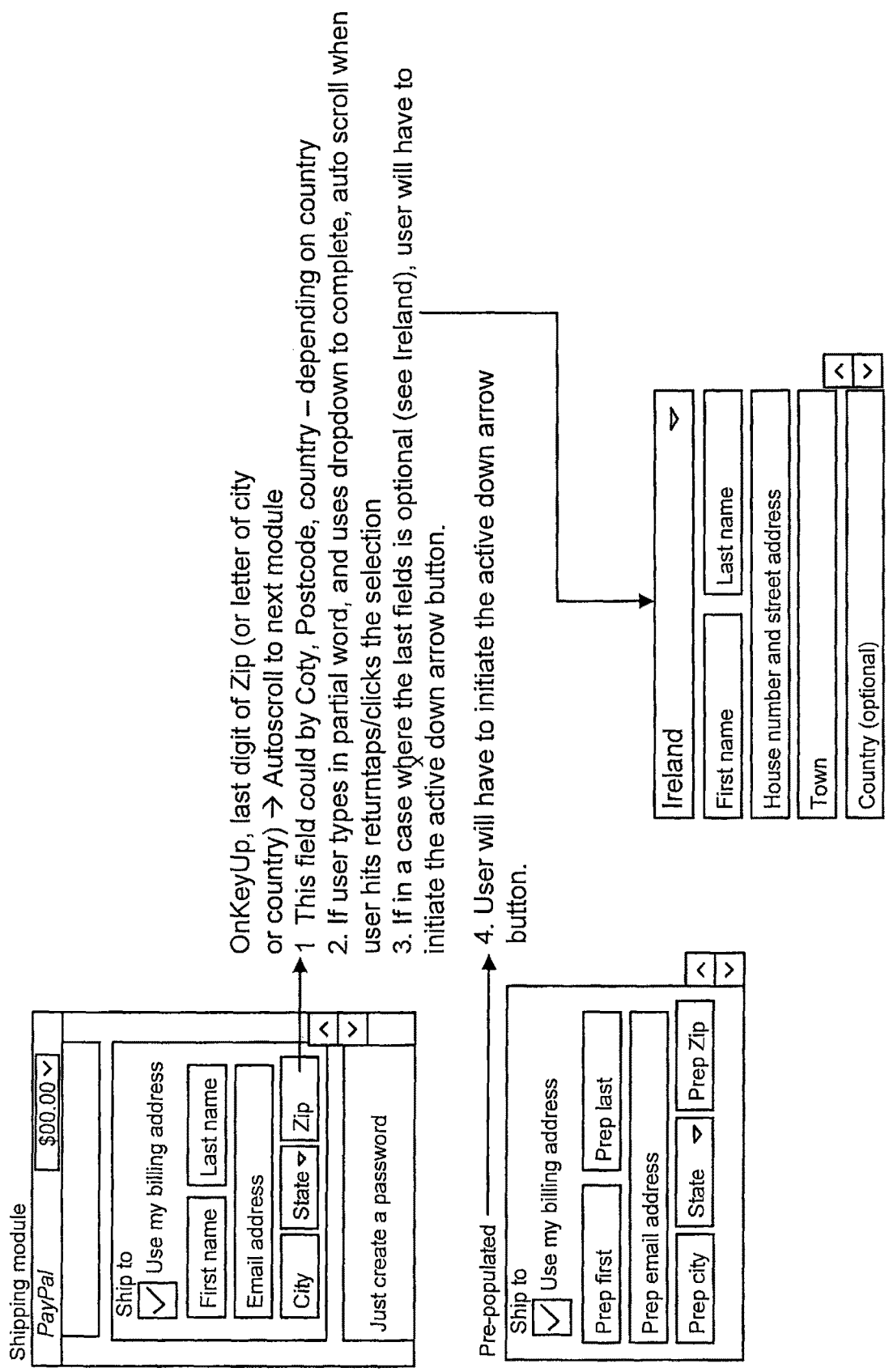
FIG. 8 provides an example of a "Shipping module" with specific rules and functionalities for this module.

FIG. 8 provides an example of a "Shipping module" with specific rules and functionalities for this module. After the user enters correct information for the billing address module, the system may then allow the user to advance to the shipping module. In an embodiment, the system may automatically scroll from the billing address module to the shipping module after the user finished filling the information at the billing address module correctly. The shipping module may include form fields configured to receive the user's name and shipping address. A check box may be provided for the user to select to use the billing address previously entered as the shipping address. The form field for the ZIP code or letter of city or country may be the last field to be completed in the shipping module. Depending on the country of the shipping address, this field may be a city, postcode, or country. If the user types in particle word and then uses dropdown menu to complete the field, the system may auto scroll when the user hits return taps or click a selection in the dropdown menu. In a case where this last field is optional, such as in Ireland, the user may navigate to the next module using navigation buttons, such as up and down arrow buttons.

FIG. 9 provides an example of an "Account creation module" with specific rules and functionalities for this module. The account creation module may be activated when a user selects a link in a website or an application of a merchant or a service provider for creating a new user account. The link may be embedded in a welcome page, a shopping page, or any other page that directs the user to create a new account. The account creation module may include form fields configured to receive user's login ID, account ID, email address, password, and confirmation of password. The system may check the email address entered by the user by inline validation to ensure that the email address is valid. The system also may ensure that the password entered in the two fields match each other. If all information entered is validated, the system may allow the user to navigate to the next module. In an embodiment, the system may auto-scroll the user to the next module.

FIG. 10 provides an example of a "Terms and conditions module" with specific rules and functionalities for this module. After the user enters correct information for the account creation module, the system may then allow the user to advance to the terms and conditions module. In an embodiment, the system may automatically scroll from the account creation module to the terms and conditions module after the user finished filling the information at the account creation module correctly. The terms and conditions module may provide the user with the terms and conditions associated with the use of the account. A check box may be provided for the user to agree to the terms and conditions. The auto-scroll function may be disabled for the terms and conditions module. As such, the user may be required to manually agree to and hit a continue button to go to the next module.

Figure 11:
FIG. 11 provides an example of autoscrolling and autofilling using the "Pay with module" described in FIG. 6, and the "Shipping module" described in FIG. 8.

FIG. 11 provides an example of autoscrolling and auto-filling using the "Pay with module" described in FIG. 6, and the "Shipping module" described in FIG. 8. Moreover, FIG. 11, provides example rules for using arrow navigation, consistent with some embodiments. In an embodiment, navigation buttons, such as up and down buttons, may be displayed at a side area of the display to allow the user to navigate to and edit prior modules. The navigation buttons may have different colors indicating whether the button is operable. For example, a down button may have a gray color indicating that the user is not allowed to go to the next module. An up button may have a darker or brighter color indicating that the up button is operable to navigate the user to the previous module.

In an embodiment, when the module has the auto-fill function, the form fields may automatically be filled with previously entered information when the user starts typing in one of the form fields. When the form fields are automatically filled, the user may tab or click in the form fields to confirm the auto-fill. The user then may select the navigation button, e.g., down button, to go to the next module. In an embodiment, the user may continue typing in the form fields to ignore the auto-fill function.

The system may follow the following general rules when implementing auto-scroll of modules. In general, the system may automatic scroll to the next module after the information input is completed correctly on each module. At the second module, the navigation buttons, such as up and down buttons, may be provided to allow the user to navigate between different modules. In particular, the up or back buttons may be active or operable for most modules, such that users may navigate to previous modules to edit or make changes to information previous input by the user. In an embodiment, the auto-scroll function may be disabled or inoperable for certain modules, such as the terms and conditions agreement module. In this case, the navigation button may be provided to allow users to navigate to the next module.

In modules where the users are required to initiate the move to the next module, navigation buttons may be provided. The users also are allowed to tab through the modules, without errors. The navigations may be consistently displayed once they appear in the navigation flow. The users may be prohibited from navigating to the next module until the information input at the current module is completed correctly.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments consistent with this disclosure may provide various modules which may be displayed within the context of the webpage without navigating away from the webpage while providing rules for autoscrolling from an active module to a next module. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
a non-transitory memory storing data on a user device; and
one or more hardware processors coupled to the nontransitory memory and configured to read instructions to cause the system to perform operations comprising:
receiving, via a browser application, an indication that a link has been selected in a first webpage on a display of the user device, wherein the link is configured to allow the browser application to leave the first webpage and open a second webpage through the browser application when the second webpage does not correspond to a fillable form;
determining that the second webpage corresponds to a fillable form;
causing, in response to a determination that the second webpage corresponds to the fillable form, the browser application to bypass leaving the first webpage and opening the second webpage and instead display one or more input fields of the fillable form of the second webpage in a module format over the first webpage, the module format comprising a plurality of modules that are scrollable;
receiving, from the user device, a set of inputs for a first module of the plurality of modules displayed over the first webpage;
determining, upon receiving the set of inputs, that a set of conditions for the first module has been satisfied; and
causing, in response to the determining that the set of conditions for the first module has been satisfied, the browser application to scroll to a next module of the plurality of modules.

2. The system of claim 1, wherein the module format causes an overlaying or a superimposing of the first module over the first webpage.

3. The system of claim 1, wherein the fillable form comprises one or more forms that include a set of fields requiring inputs from the user device.

4. The system of claim 3, wherein the set of fields comprise one or more of a payment account, a billing address, shipping information, account creation information, or a terms and conditions agreement.

5. The system of claim 3, wherein the set of conditions for the first module is determined to be satisfied when a set of fields of a form corresponding to the first module has been completely populated by the inputs from the user device.

6. The system of claim 1, wherein the causing the browser application to scroll to a next module comprises replacing the first module with a second module of the plurality of modules as the module displayed over the first webpage.

7. The system of claim 1, wherein the operations further comprise:
determining that a currently displayed module is a last module of the plurality of modules; and
in response to determining that the currently displayed module is the last module of the plurality of modules, exiting the module format by discontinuing the display of the currently displayed module over the first webpage.

8. A method comprising:
receiving, via a browser application, an indication that a link has been selected in a first webpage on a display of a user device, wherein the link enables the browser application to leave the first webpage and navigate to a second webpage when the second webpage does not contain one or more fillable fields;
determining that the second webpage contains one or more tillable fields;
causing, response to a determination that the second webpage contains the one or more fillable fields, the browser application to bypass leaving the first webpage and instead display, over the first webpage and without navigating to the second webpage, the one or more fillable fields of the second webpage in a first module of a plurality of modules, the plurality of modules being scrollable;

receiving, from the user device, a set of inputs for the first module that is displayed over the first webpage;

determining, upon receiving the set of inputs, that a set of conditions for the first module has been satisfied; and causing, in response to the determining that the set of conditions for the first module has been satisfied, the browser application to scroll to a next module of the plurality of modules.

9. The method of claim 8, wherein the first module is displayed over the first webpage at least in part by overlaying or superimposing the first module over the first webpage.

10. The method of claim 8, wherein the plurality of modules comprise forms that include a set of fields requiring inputs from the user device.

11. The method of claim 10, wherein the set of fields correspond to one or more of a payment account, a billing address, shipping information, account creation information, or a terms and conditions agreement.

12. The method of claim 10, wherein the set of conditions for the first module is determined to be satisfied when a set of fields of a form corresponding to the first module has been completely populated by the inputs from the user device.

13. The method of claim 8, wherein causing the browser application to scroll to a next module comprises replacing the first module with a second module of the plurality of modules as a module displayed over the first webpage.

14. The method of claim 8, further comprising:
determining that a currently displayed module is a last module of the plurality of modules; and
in response to determining that the currently displayed module is the last module of the plurality of modules, discontinuing the display of the currently displayed module over the first webpage.

15. A non-transitory machine-readable medium comprising a plurality of machine-readable instructions executable to cause a machine to perform operations comprising:
receiving, via a browser application, an indication that a link has been selected in a first webpage on a display of the user device, wherein the link allows the browser application to exit the first webpage and open a second webpage when the second webpage does not contain user-fillable content;
determining that the second webpage contains user-fillable content;
causing, in response to a determination that the second webpage contains the user-fillable content, the browser application to bypass exiting the first webpage and instead enter a module format without opening the second webpage, wherein the browser application enters the module format at least in part by displaying the user-fillable content of the second webpage in a first module of a plurality of modules over the first webpage, the plurality of modules being scrollable;
receiving, from the user device, a set of inputs for the first module that is displayed over the first webpage;
determining, upon receiving the set of inputs, that a set of conditions for the first module has been satisfied; and
causing, in response to the determining that the set of conditions for the first module has been satisfied, the browser application to scroll to a next module of the plurality of modules.

16. The non-transitory machine-readable medium of claim 15, wherein the module format is entered at least in part by overlaying or superimposing the first module over the first webpage.

17. The non-transitory machine-readable medium of claim 15, wherein the plurality of modules comprise forms that include a set of fields requiring inputs from the user device.

18. The non-transitory machine-readable medium of claim 17, wherein the set of conditions for the first module is determined to be satisfied when a set of fields of a form corresponding to the first module has been completely populated by the inputs from the user device.

19. The non-transitory machine-readable medium of claim 15, wherein the causing the browser application to scroll to a next module comprises replacing the first module with a second module of the plurality of modules as the module displayed over the first webpage.

20. The non-transitory machine-readable medium of claim 15, wherein the operations further comprise:
determining that a currently displayed module is a last module of the plurality of modules; and
in response to determining that the currently displayed module is the last module of the plurality of modules, exiting the module format by discontinuing the display of the currently displayed module over the first webpage.

* * * * *